(12) United States Patent
Gross et al.

(10) Patent No.: US 7,633,181 B2
(45) Date of Patent: Dec. 15, 2009

(54) DC-BASED DATA CENTER POWER ARCHITECTURE

(75) Inventors: Peter Gross, Santa Monica, CA (US); Kfir Godrich, Morganville, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/421,516

(22) Filed: Jun. 1, 2006

(65) Prior Publication Data

US 2006/0284489 A1 Dec. 21, 2006

Related U.S. Application Data

(60) Provisional application No. 60/686,633, filed on Jun. 2, 2005.

(51) Int. Cl.
*H02J 9/00* (2006.01)
*H02J 3/00* (2006.01)
*H02J 1/10* (2006.01)

(52) U.S. Cl. ..................................... 307/68; 307/43
(58) Field of Classification Search ................. 307/43, 307/68
See application file for complete search history.

(56) References Cited

U.S. PATENT DOCUMENTS 3,287,623 A 11/1966 Valancius
5,861,684 A 1/1999 Slade et al.
6,184,593 B1 2/2001 Jungreis
6,191,500 B1 * 2/2001 Toy ............... 307/64
6,559,559 B2 5/2003 Cratty
6,720,674 B1 4/2004 Gabrys
6,930,578 B2 * 8/2005 Thibault et al. ........... 336/5
7,141,894 B2 * 11/2006 Kraus ................. 307/65
2004/0150374 A1 8/2004 Kraus
2005/0071092 A1 3/2005 Farkas et al.
2005/0094330 A1 * 5/2005 Guenther et al. ........... 361/18

OTHER PUBLICATIONS

Stansberry, M., "Power-saving technologies in the data center," SearchDataCenter.com, Nov. 10, 2005.

* cited by examiner

*Primary Examiner*—Albert W Paladini
*Assistant Examiner*—Hal I Kaplan (57) ABSTRACT

A DC-based power system including: an AC power distribution system for providing AC power to a first node and a second node; a first converting system coupled to the first node that converts AC power to DC power and outputs the DC power to a first distributed bus bar; a second converting system coupled to the second node that converts AC power to DC power and outputs the DC power to a second distributed bus bar; a first set of DC/DC converters that steps down the DC power from the first distributed bus bar to a first stepped down DC voltage; a second set of DC/DC converters that steps down the DC power from the second distributed bus bar to a second stepped down DC voltage; and a critical load distribution system that is powered by both the first stepped down DC voltage and the second stepped down DC voltage.

17 Claims, 6 Drawing Sheets

DC-BASED DATA CENTER POWER ARCHITECTURE

RELATED APPLICATION

This application claims priority to co-pending provisional application entitled DC2 CONCEPT, filed on Jun. 2, 2005, Ser. No. 60/686,633, the content of which is hereby incorporated by reference.

FIELD OF THE INVENTION

The invention relates generally to power distribution systems, and more particularly, to a DC-based architecture for powering data centers.

BACKGROUND OF THE INVENTION

With the advent of the information technology age, data center have become critical to the operation of almost all large scaled enterprises. Illustrative enterprises that rely on data centers include: financial service companies, government agencies, defense operations, hospitals, commercial Web-sites, etc. As the need to accommodate and process more and more data grows, greater and greater demands are placed onto the infrastructure of the data center.

Issues that must be addressed include: providing an infrastructure that can maintain 24/7 operations; controlling the amount of physical space required; providing the necessary cooling requirements; and managing the power consumption. As availability requirements (i.e., the amount of uptime) placed on data centers increase, these issues will continue to drive up the costs associated with operating data centers.

Power consumed by the equipment found in a data center can account for up to 50% of the total cost of operating such a facility. One of the main culprits of this power consumption lies in the fact that most data centers rely on AC to power the servers and other equipment. In a typical computer power supply distribution architecture, AC power is delivered to a component (e.g., a server), which then converts the power to DC to operate the various controllers, drives, memory, etc., associated with the component. Traditional AC power supplies operate at about a 70% efficiency level, which results in a significant waste of energy resources.

In addition to providing relatively low power efficiency, such configurations also generate a significant amount of heat that must be dealt with. The thermal load problem is further exacerbated by the use and introduction of technologies such as "blading" into the data center architecture. Blading utilizes high density blade chassis installed in cabinets into which "blades" can be plugged. Each blade incorporates a device (such as a server) that is significantly smaller and denser than traditional rack mounted components.

One solution that would address the issues faced by data centers is to utilize a DC-based architecture to power the equipment in the data centers. Unfortunately, no DC-based architectural infrastructure has been developed or proposed that will adequately address the major operational issues faced by data centers. Accordingly, a need exists for a DC-based architecture for data centers.

SUMMARY OF THE INVENTION

The present invention addresses the above-mentioned problems, as well as others, by providing a DC-based architectural infrastructure for data centers.

In a first aspect, the invention provides a DC-based power distribution architecture for powering a data center, comprising: a first stage for delivering AC power to the data center from a utility line and from a distributed energy resource, wherein both the utility line and distributed energy resource provide AC power to a first node and second node; a second stage that includes a first set of rectifier/charger (RC) units coupled to the first node that converts AC power to DC power and outputs the DC power to a first distributed bus bar, and a second set of RC units coupled to the second node that converts AC power to DC power and outputs the DC power to a second distributed bus bar; a third stage that includes a first set of DC/DC converters that steps down the DC power from the first distributed bus bar to a first stepped down DC voltage, and a second set of DC/DC converters that steps down the DC power from the second distributed bus bar to a second stepped down DC voltage; and a fourth stage that includes a dual path power distribution system that is powered by both the first stepped down DC voltage and the second stepped down DC voltage.

In a second aspect, the invention provides a method for powering a data center using DC power, comprising: providing AC power to the data center from a utility line and from a distributed energy resource, wherein both the utility line and distributed energy resource provide AC power to a first node and second node; utilizing a first set of rectifier/charger (RC) units coupled to the first node to convert AC power to DC power and outputting the DC power to a first distributed bus bar; utilizing a second set of RC units coupled to the second node to convert AC power to DC power and outputting the DC power to a second distributed bus bar; utilizing a first set of DC/DC converters to step down the DC power from the first distributed bus bar to a first stepped down DC voltage; utilizing a second set of DC/DC converters to step down the DC power from the second distributed bus bar to a second stepped down DC voltage; and powering a critical load by both the first stepped down DC voltage and the second stepped down DC voltage.

In a third aspect, the invention provides a DC-based power distribution system, comprising: an AC power distribution system for providing AC power to a first node and a second node; a first converting system coupled to the first node that converts AC power to DC power and outputs the DC power to a first distributed bus bar; a second converting system coupled to the second node that converts AC power to DC power and outputs the DC power to a second distributed bus bar; a first set of DC/DC converters that steps down the DC power from the first distributed bus bar to a first stepped down DC voltage; a second set of DC/DC converters that steps down the DC power from the second distributed bus bar to a second stepped down DC voltage; and a critical load distribution system that is powered by both the first stepped down DC voltage and the second stepped down DC voltage.

Unlike traditional rack servers, today's leading rack-mount and open blade servers can be powered with a vastly more reliable DC power. DC power supplies achieve efficiency levels of 93% at the component level, compared to 70% efficiency in traditional AC power supplies. In addition, by distributing redundant DC power to each server, approximately 20% to 40% of the thermal load is shifted outside the server to AC-to-DC rectifiers. As a result, server reliability can be increased by as much as 27%, and monthly power costs can be reduced by as much as 30%.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
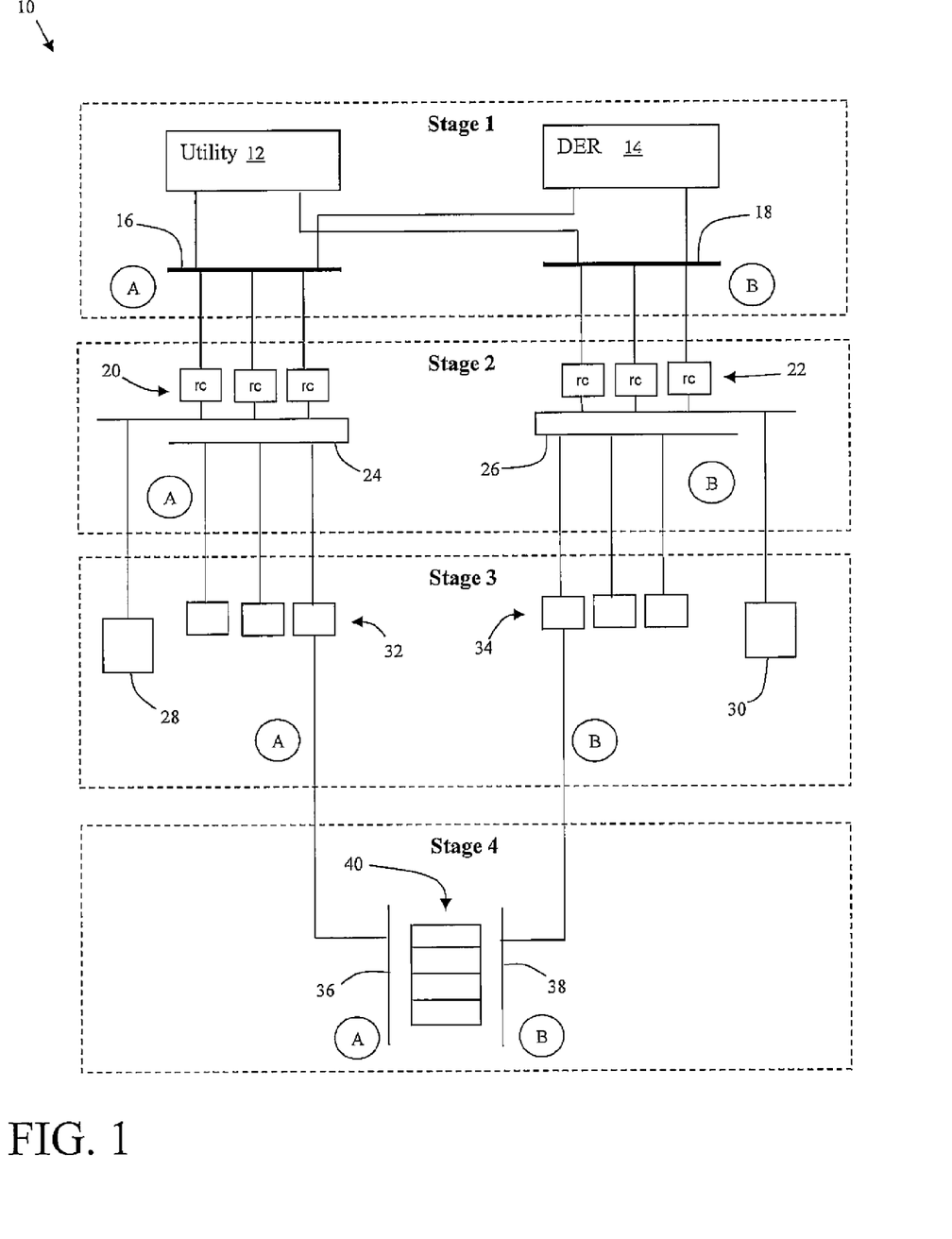
FIG. 1 depicts a DC-based power distribution architecture in accordance with an embodiment of the present invention.

Referring now to drawings, FIG. 1 depicts an overview of an illustrative DC-based power distribution architecture 10 for powering critical loads 40 in a data center. Critical loads 40 are the main loads of a data center and include, for instance, equipment installed in cabinets (e.g., servers, computing components, etc.), on racks (e.g., telecom equipment such as routers and switches) or directly on the floor (e.g., heavy storage devices, etc.). Mechanical loads (not shown in FIG. 1) are related to HVAC systems, plumbing systems and various other essential loads supporting the critical loads 40. Note that for the purpose of this disclosure the term "data center" may refer to any facility that includes high density devices and/or other systems that run on DC, such as computer systems, servers, telecom equipment, medical equipment, etc.

Power distribution architecture 10 is shown broken down into four stages. In general, stage 1 provides an AC power distribution system that receives redundant high voltage AC power, and distributes the redundant high voltage AC power to an A side and a B side. Stage 2 separately converts (e.g., rectifies) the A side and B side to DC. Stage 3 steps down the DC voltage on each side to a level suitable for powering critical loads 40, and also includes backup support. Stage 4 is the level at which the critical loads 40 reside, and which delivers the stepped down DC power from both the A side and B side to, e.g., a cabinet housing the critical loads 40. By configuring the power distribution architecture 10 in this manner, numerous advantages are gained, including the ability to provide increased efficiencies, better management of the cooling requirements associated with the data center, the ability to house the equipment for the different stages in different rooms or areas within the data center, etc. Details regarding each stage are provided below.

As noted, stage 1 provides a platform for delivering AC power to the data center, typically from a set of utility lines 12 and from a set of distributed energy resources (DER) 14. In this illustrative embodiment, the utility lines 12 feeding the data center comprise medium voltage (MV) lines provided in a redundant configuration, i.e., a plurality of utility lines are used to power multiple nodes. For instance, as shown in FIG. 1, a first utility line is provided for feeding a first node 16, and a second utility line is provided for feeding a second node 18. In addition, although not shown in this figure, a similar redundant configuration is used to power a set of mechanical loads (see, e.g., FIG. 2).

Typically, the utility lines 12 arrive to the data center in a redundant distribution to a main substation and are then distributed internally with an MV dual path to local substations at the data-hole level that include transformers to bring the voltage to a required level in the range of 400-660 volts AC, at 50 Hz or 60 Hz. In the event the utility lines 12 fail, the distributed energy resources (DER) 14 start and supply the loads to the data center. Note that DERs 14 may comprise any system for providing backup AC power. Illustrative DERs 14 include an engine/generator combination (which can start in about eight seconds from command), main storage devices integrated with an engine/generator combination to create a continuous power supply, an alternative energy source, etc. Main storage devices may include a variation of solutions based on mass or velocity (e.g., low or high speed). Similar to the utility lines 12, the output voltage of DERs 14 is 400-660 volts AC, at 50 Hz or 60 Hz. The autonomy time for the DERs is typically about 15 seconds per side at full load. An engine/generator combination or continuous power supply will continue to supply the loads based on the amount of fuel provided to the site.

Both the utility lines 12 and DERs 14 distribute AC power to a first node 16 and second node 18 to provide redundancy to both the A and B sides. In a typical embodiment, the first node 16 and second node 18 may be implemented as computer substations that are replicated throughout the data center.

The next stage, stage 2, includes an array of rectifier/charger (RC) units 20, 22 arranged in a 2(N+1) configuration. 2(N+1) means that 2 modular systems are used (system+system) to supply the load with one module being redundant in each system. As can be seen, each node 16, 18, from stage 1 is coupled to a distinct set of RC units 20, 22. For a typical data-hole of a 1 Mega Watt critical load (e.g., node 16), three RC units 20 of 500 Kilowatts (KW) can be used. A data-hole or "pod" generally comprise an array of cabinets of servers and communication devices, usually separated physically from other same type data-holes. A typical data-hole may for instance take up 10,000 square feet of a 60,000 square foot data center. Each of the RC units 20, 22 take the AC power from the respective node 16, 18 and rectifies it to a level of 500-550 volts DC. The resulting DC power from each set of RC units 20, 22 is outputted to a first distributed bus bar 24 and a second distributed bus bar 26, respectively. Note that the term "RC unit" as used herein may comprise any now known or later developed device or system capable of converting AC to DC.

Stage 3 provides a first set of DC/DC converters 32 that steps down the DC power from the first distributed bus bar 24, and a second set of DC/DC converters 34 that steps down the DC power from the second distributed bus bar 26. The DC/DC converters 32, 34 are in the range of 100-150 KW, bucking the voltage from a low voltage level to very low voltage level of, e.g., −48 volts DC. Note that while the illustrative embodiments describe an architecture that utilizes −48 volts DC, the range of the DC voltages that can be used at the cabinet (stage 4) level in accordance with this invention may vary depending upon the particular application, e.g., DC voltages in the range of +/−24 to +/−400 could be utilized. Note that the term "DC/DC converter" as used herein may comprise any now known or later developed device or system for stepping down a DC voltage from a first level to a second level.

In addition, stage 3 includes a redundant intermediary storage system in the form of a first type of intermediary storage 28 coupled to the first distributed bus bar 24, and a second type of intermediary storage 30 coupled to the second distributed bus bar 26. In one illustrative embodiment, a first type of intermediary storage 28 may for example comprise chemical battery systems, while a second type of intermediary storage 30 may be implemented using high speed flywheels. If chemical battery systems are used, then charging functions are required when specifying the controls of the RC units 20 in stage 2. If other storage devices are used, such as high speed flywheels, then no charging functions are required. Autonomy time is about 15 seconds per side at full load, but if chemical storage is used, then 10 minutes per side is typical.

At stage 4, the −48 volts DC is distributed from both sides to a critical load 40, such as a cabinet, rack, etc. In the case of a cabinet, the −48 volts DC may be distributed to the cabinet rows of each cabinet using a dual path power distribution system, e.g., using a bus bar system or a remote power panel and cabling system. At the cabinet level, a dual path power distribution frame 36, 38 is used to internally distribute the power. Each power distribution frame 36, 38 is fed from the remote power panel on the end of each row or using tap-offs from a −48 volts DC bus bar system.

Each power distribution frame 36, 38 may also include a local storage device (not shown) to provide several seconds of backup at full load to achieve dynamic stability of supercritical loads during upstream switching processes. Examples of such local storage devices include ultra/super-capacitor based system that could reside separately or be integrated into each power distribution frame 36, 38.

Figure 2:
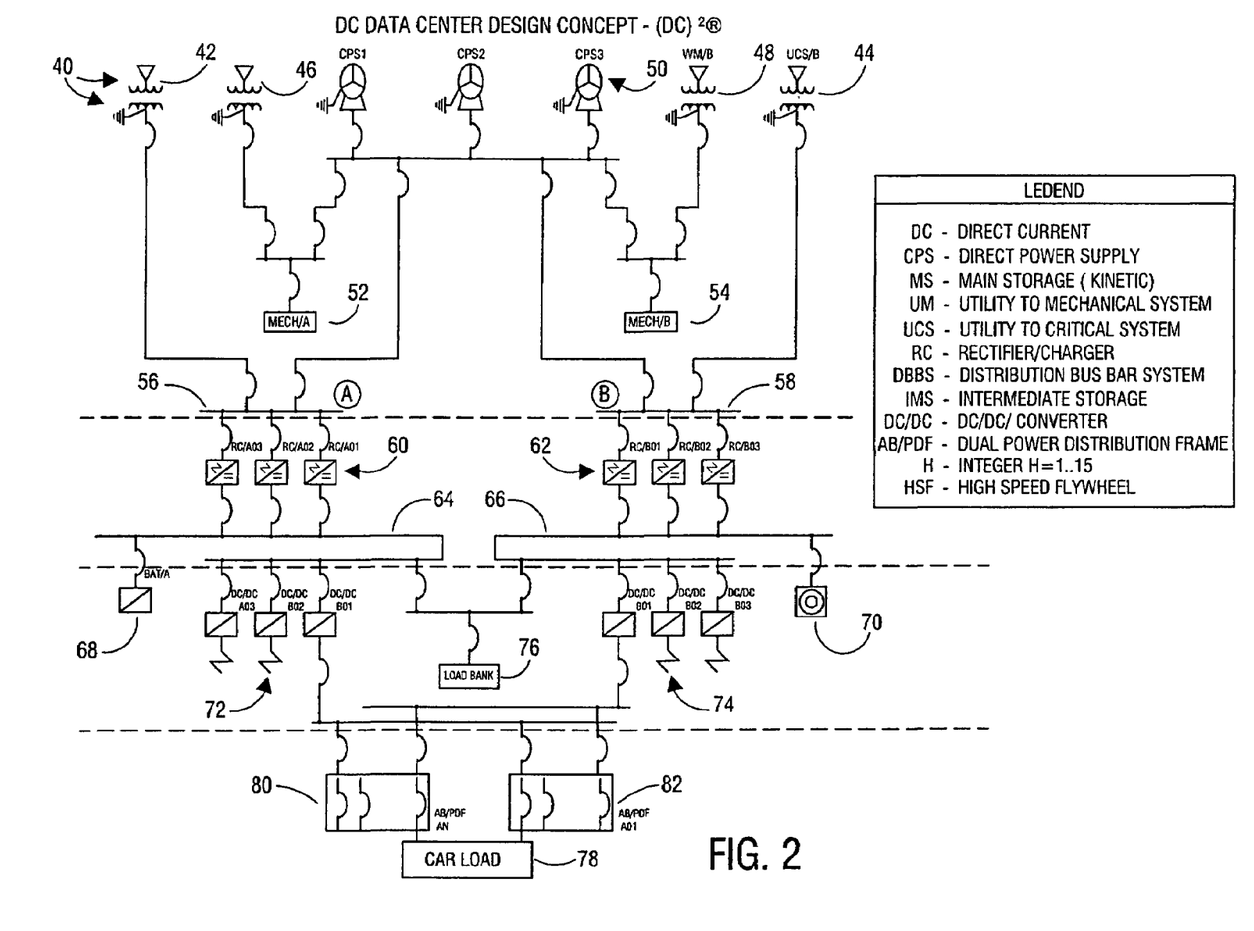
FIG. 2 depicts an illustrative schematic for implementing a DC-based power distribution architecture in accordance with an embodiment of the present invention.

FIG. 2 depicts an illustrative schematic 40 for implementing the power distribution architecture described above. As shown, a set of utility lines 42, 44, 46, 48 and a set of continuous power supplies 50 (DERs) are utilized to provide AC power to an A side node 56, an A side mechanical load 52, a B side mechanical load 54 and a B side node 58. A first set of rectifiers 60 convert the AC power from the A side node 56 into DC for distribution to an A side distribution bus bar 64. A second set of rectifiers 62 convert the AC power from the B side node into DC for distribution to a B side distribution bus bar 66.

Next, a first set of DC/DC converters 72 drops down the DC voltage from the A side distribution bus bar 64 to −48 volts DC, and a second set of DC/DC converters 74 drops down the DC voltage from the B side distribution bus bar 66 to −48 VDC. In addition, a chemical battery 68 provides intermediary storage to the A side distribution bus bar 64, and a high speed flywheel 70 provides intermediary storage to the B side distribution bus bar 66. Furthermore, a load bank 76 is coupled to both the A and B side distribution bus bars 64, 66. A load bank 76 is a device that is used to simulate a load to an electrical source such as a generator or universal power supply (UPS). Load bank 76 can be used also to simulate thermal loads for testing cooling systems.

Next, a plurality of dual power distribution frames 80, 82 are provided, with each receiving −48 volts DC from an A side DC/DC converter 72 and a B side DC/DC converter 74. Critical loads 78 within the data center are then powered by a first and second dual power distribution frame 80, 82.

Figure 3:
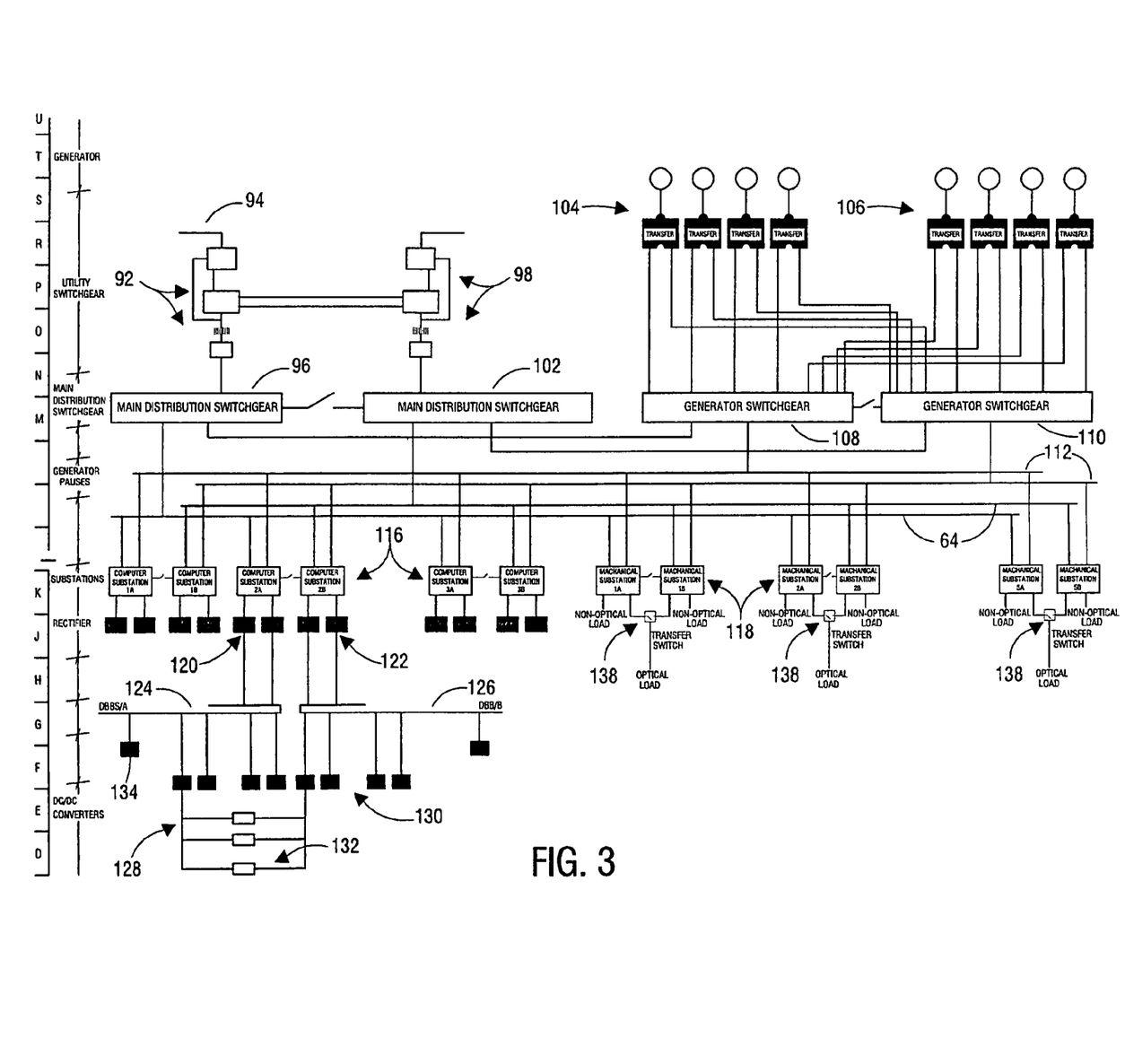
FIG. 3 depicts a variation of a DC-based power distribution architecture in accordance with an embodiment of the present invention.

FIG. 3 shows a schematic 90 depicting a further variation of the power distribution architecture that includes two utility lines 94,100 and two sets of DERs 104,106 for generating AC power. Coupled to the two utility lines 94,100 is utility switchgear 92, 98, which distributes the AC power to first and second main distribution switchgear 96, 102. Similarly the two sets of DERs 104,106 are redundantly coupled to first and second generator switchgear 108, 110. The first and second main distribution switchgear 96, 102 and first and second generator switchgear 108, 110 redundantly distribute AC power to a pair of generator buses 112 and normal buses 114, e.g., at 480 volts AC. A plurality of computer substations 116 and mechanical substations 118 are redundantly powered by the generator buses 112 and normal buses 114. The mechanical substations 118 distribute AC power to various non-critical loads in the data center and some critical loads via a transfer switch 138.

The computer substations 116 distribute power to a first set of rectifier/chargers 120 and a second set of rectifier/chargers 122, which in turn distribute DC power to an A side distributed bus bar 124 and a B side distributed bus bar 126. Intermediary storage 134, 136 is provided to both the A side distributed bud bar 124 and the B side distributed bus bar 126. The A side distributed bus bar 124 and B side distributed bus bar 126 distribute power to an A side set of DC/DC converters 128 and a B side of DC/DC converters 130, respectively. The DC/DC converters 126, 128, drop the DC voltage down, e.g., to −48 volts DC. A plurality of critical loads 132 receive the stepped down DC voltage from both an A side and B side DC/DC converter via, e.g., a set of dual plan power distribution frames.

Figure 4:
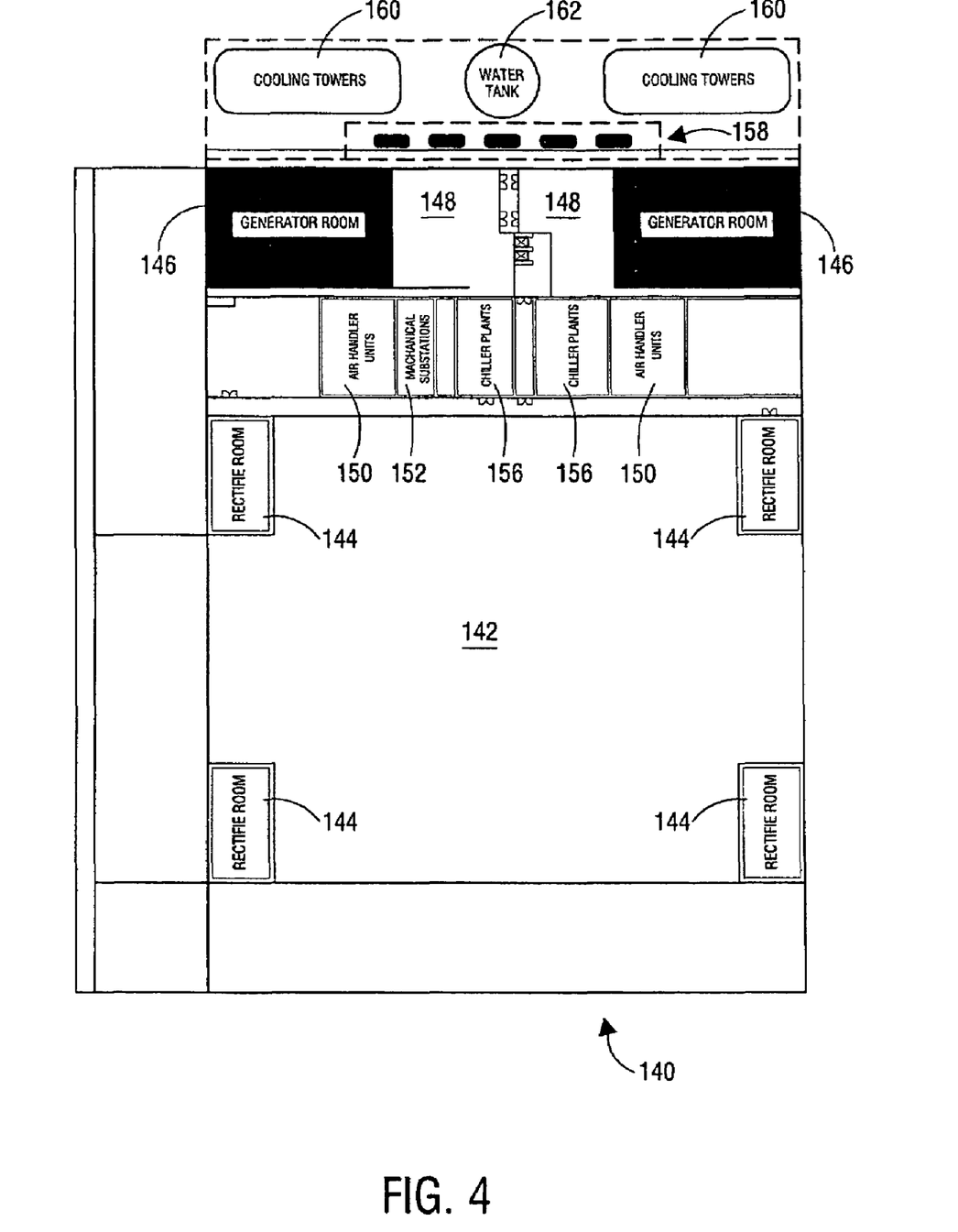
FIG. 4 depicts a floor plan of a data center utilizing a DC-based power distribution architecture in accordance with an embodiment of the present invention.

FIG. 4 depicts an illustrative floor plan of a data center 140 that incorporates the DC-based power distribution architecture described above. Located externally to the structure are cooling towers 160, a water tank 162 and a plurality of fuel tanks 158. Within the building are utility and generator switch gear rooms 148, generator rooms 146, air handler units 150, a mechanical substation 152, and chiller plants 156. A main room 142 is provided for storing the critical loads associated with data center, e.g., racks, cabinets, power distribution frames, etc. In addition, a plurality of rectifier rooms 144 are provided for the rectifier/charger units that convert the AC power to DC. Because the rectifier/chargers are stored in separate rooms, apart from the critical loads, cooling and power management are much easier to control. Obviously, floor plan 140 is but one illustrative example of a data center floor plan in which the power distribution architecture of the present invention could be applied.

Figure 5:
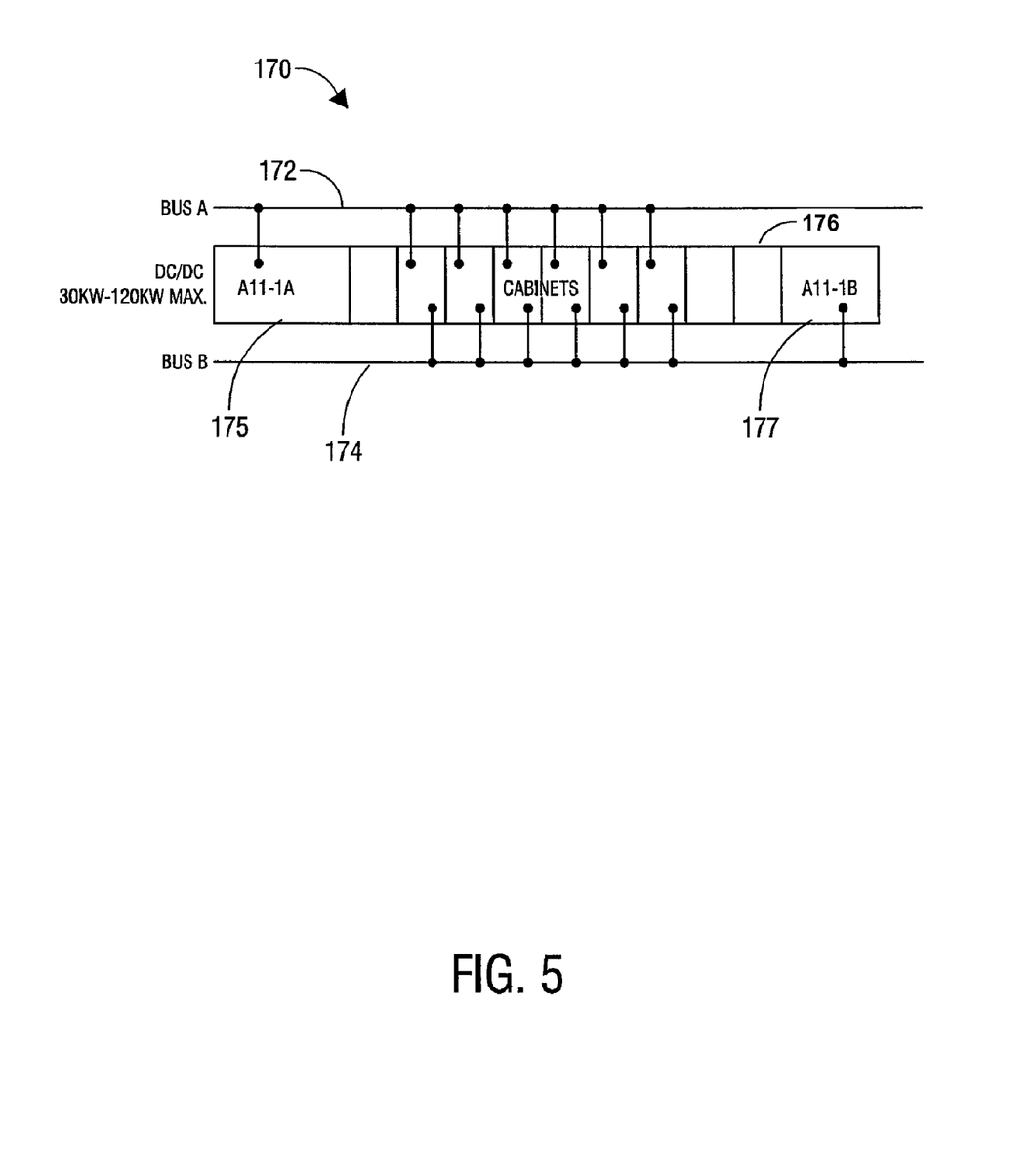
FIG. 5 depicts a dual path power distribution frame for distributing redundant DC power to critical loads in accordance with an embodiment of the present invention.

FIG. 5 depicts an illustrative configuration for a dual path power distribution system 170 for distributing redundant DC power to the critical loads at the stage 4 (e.g., rack or cabinet) level. In this illustrative embodiment, each cabinet in a set of cabinets 176 is powered by a first bus 172 (BUS A) and a second bus 174 (BUS B). Thus, in this configuration, each cabinet 176 receives redundant DC power from DC/DC converter units 175, 177 located at the end of each row of cabinets/racks.

Figure 6:
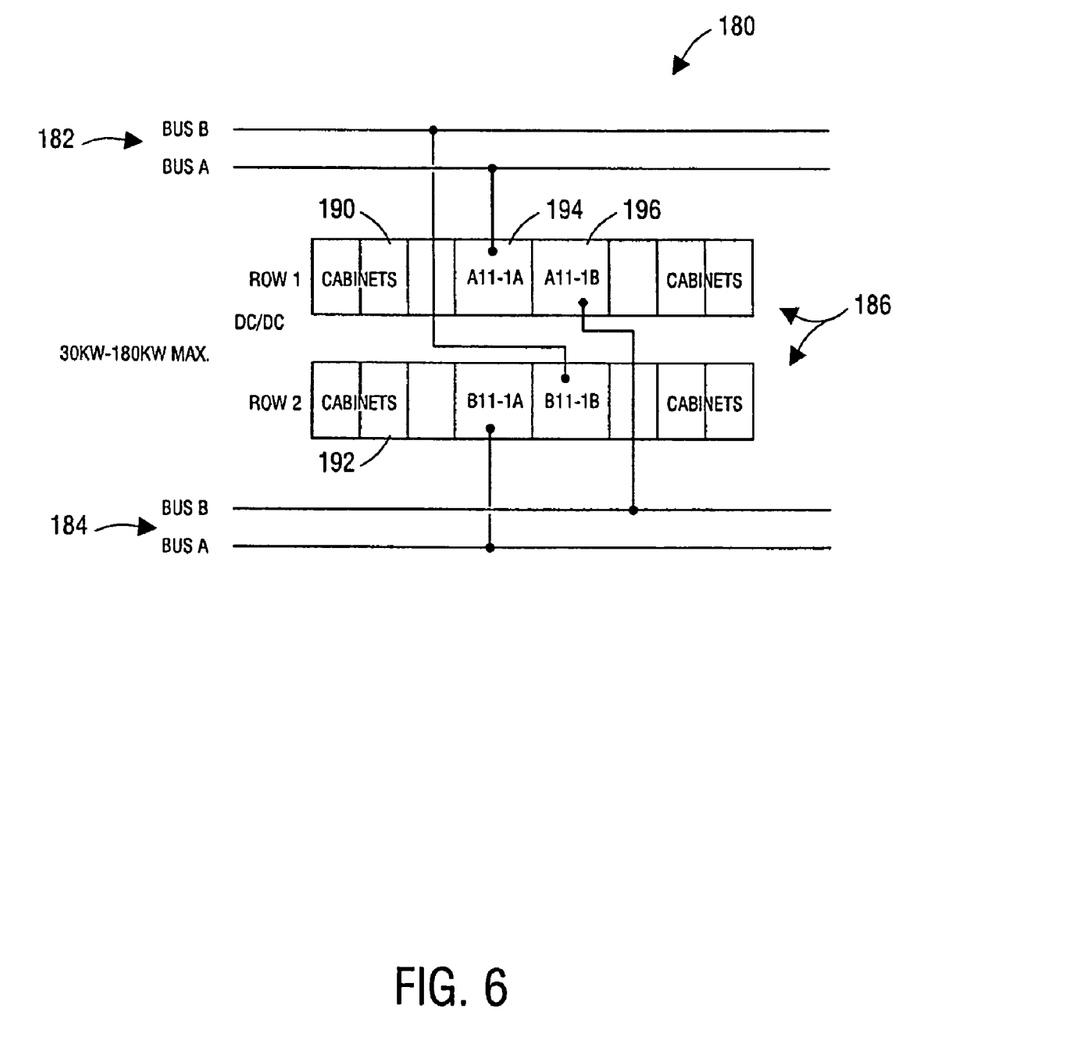
FIG. 6 depicts an alternative dual path power distribution frame for distributing redundant DC power to critical loads in accordance with an embodiment the present invention.

FIG. 6 depicts an alternative illustrative configuration for a dual path power distribution system 180 for distributing redundant DC power to the critical loads 186 at the stage 4 (e.g., rack/cabinet) level. In this case, the configuration utilizes a first redundant pair of A/B buses 182 and a second redundant pair of A/B buses 184 to power the critical loads. The critical loads 186 are arranged as two rows of cabinets 190, 192, with the first row 190 receiving redundant power from an A bus of the first redundant pair of A/B buses 182 and a B bus of the second redundant pair of A/B buses 184. Conversely, the second row 192 receives redundant power from an A bus of the second redundant pair of A/B buses 184 and a B bus of the first redundant pair of A/B buses 182. In this case, each row may be powered by an internal A/B power distribution system (e.g., from DC/DC converters 194, 196), as opposed to directly powering individual cabinets from the A/B buses 182, 184.

Note that for the purposes of this disclosure, the term dual path power distribution system refers to any system for providing power to a component or set of components from two paths. Furthermore, while the configurations shown in FIGS. 5 and 6 provide two illustrative examples of dual path power distribution systems, any system or configuration for powering critical loads at the rack/cabinet level may be utilized.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For instance, the voltage ranges and devices described herein are provided for illustrative purposes, and any now known or later developed alternatives should be considered to fall within the scope of the claimed invention.

The invention claimed is:

1. A method for powering a data center using DC power, comprising:
    providing AC power to the data center from a utility line and from a distributed energy resource, the distributed energy resource providing AC power as a backup to the utility line, wherein both the utility line and distributed energy resource provide AC power to a first node and second node;
    utilizing a first set of rectifier/charger (RC) units coupled to the first node to convert AC power to DC power and outputting the DC power to a first distributed bus bar;
    utilizing a second set of RC units coupled to the second node to convert AC power to DC power and outputting the DC power to a second distributed bus bar;
    utilizing a first set of DC/DC converters to step down the DC power from the first distributed bus bar to a first stepped down DC voltage;
    utilizing a second set of DC/DC converters to step down the DC power from the second distributed bus bar to a second stepped down DC voltage; and
    powering a critical load by both the first stepped down DC voltage and the second stepped down DC voltage, wherein the first set of DC/DC converters and the second set of DC/DC converters are included in a dual path power distribution system that includes a first redundant pair of busses and a second redundant pair of busses, each of the first redundant pair of busses coupled to a first plurality of loads and each of the second redundant pair of buses coupled to a second plurality of loads, and wherein the first set of DC/DC converters is coupled to a load bank coupled to the first distributed bus bar and the second distributed bus bar, the load bank configured to simulate a thermal load for testing a cooling system.

2. The method of claim 1, including the step of stepping down the AC power from the utility line to approximately 400-660 Volts AC.

3. The method of claim 1, wherein the distributed energy resource comprises a plurality of backup power supplies that generate approximately 400-660 Volts AC.

4. The method of claim 1, comprising the further step of powering a plurality of mechanical loads by both the utility line and distributed energy resource.

5. The method of claim 1, wherein the DC power on the first and second distributed bus bars is approximately 500-550 Volts DC.

6. The method of claim 1, wherein the first distributed bus bar includes a first type of intermediate storage device and the second distributed bus bar includes a second type of intermediate storage device.

7. The method of claim 6, wherein the first type of intermediate storage device comprises a battery and the second type of intermediate storage device comprises a flywheel.

8. The method of claim 1, wherein the first and second stepped down DC voltage are approximately −48 Volts DC.

9. The method of claim 1, comprising the further step of using a dual path power distribution system to power the critical load, wherein the dual path power distribution system includes a local storage device selected from the group consisting of:
    a capacitor based device and a fuel cell.

10. The method of claim 9, wherein the dual path power distribution system includes a cabinet for powering a plurality of components.

11. A DC-based power distribution system, comprising:
    an AC power distribution system for providing AC power to a first node and a second node, the AC power distribution system including at least one utility line for providing AC power and at least one distributed energy resource for providing AC power as a backup to the at least one utility line;
    a first converting system coupled to the first node that converts AC power to DC power and outputs the DC power to a first distributed bus bar;
    a second converting system coupled to the second node that converts AC power to DC power and outputs the DC power to a second distributed bus bar;
    a first set of DC/DC converters that steps down the DC power from the first distributed bus bar to a first stepped down DC voltage;
    a second set of DC/DC converters that steps down the DC power from the second distributed bus bar to a second stepped down DC voltage; and
    a critical load distribution system that is powered by both the first stepped down DC voltage and the second stepped down DC voltage, wherein the first set of DC/DC converters is coupled to a load bank that is coupled to the first distributed bus bar and the second distributed bus bar, the load bank configured to simulate a thermal load for testing a cooling system.

12. The DC-based power distribution system of claim 11, wherein the first and second converting system include rectifier/charger (RC) units that generate approximately 500-550 Volts DC.

13. The DC-based power distribution system of claim 11, wherein the first and second set of DC/DC converters generate approximately −48 Volts DC.

14. The DC-based power distribution system of claim 11, wherein the first and second sets of DC/DC converters generate voltage in a range of approximately +/−24 to 400 volts DC.

15. The DC-based power distribution system of claim 11, wherein the first distributed bus bar includes a first type of intermediate storage device and the second distributed bus bar includes a second type of intermediate storage device.

16. The DC-based power distribution system of claim 11, wherein the first type of intermediate storage device comprises a battery and the second type of intermediate storage device comprises a flywheel.

17. A DC-based power distribution architecture for powering a data center, comprising:
- a first stage for delivering AC power to the data center, the first stage including a utility line and a distributed energy resource, the utility line configured to provide AC power for utilization at the data center, the distributed enemy resource being configured to operate as a backup AC power source to the utility line, wherein both the utility line and distributed enemy resource provide AC power to a first node and second node;
- a second stage that includes a first set of rectifier/charger (RC) units coupled to the first node that converts AC power to DC power and outputs the DC power to a first distributed bus bar, and a second set of RC units coupled to the second node that converts AC power to DC power and outputs the DC power to a second distributed bus bar;
- a third stage that includes a first set of DC/DC converters that steps down the DC power from the first distributed bus bar to a first stepped down DC voltage, and a second set of DC/DC converters that steps down the DC power from the second distributed bus bar to a second stepped down DC voltage; and
- a fourth stage that includes a dual path power distribution system that is powered by both the first stepped down DC voltage and the second stepped down DC voltage, wherein the dual path power distribution system includes a first redundant pair of busses and a second redundant pair of busses, each of the first redundant pair of busses coupled to a first plurality of loads and each of the second redundant pair of buses coupled to a second plurality of loads, wherein the third stage further includes a load bank coupled to the first distributed bus bar and the second distributed bus bar, the load bank configured to simulate a thermal load for testing a cooling system.

* * * * *

UNITED STATES PATENT AND TRADEMARK OFFICE
CERTIFICATE OF CORRECTION

| | | |
|---|---|---|
| PATENT NO. | : 7,633,181 B2 | Page 1 of 1 |
| APPLICATION NO. | : 11/421516 | |
| DATED | : December 15, 2009 | |
| INVENTOR(S) | : Peter Gross et al. | |

It is certified that error appears in the above-identified patent and that said Letters Patent is hereby corrected as shown below:

In column 9, line 6, in Claim 17, delete "enemy" and insert -- energy --, therefor.

In column 9, line 9, in Claim 17, delete "enemy" and insert -- energy --, therefor.

Signed and Sealed this
Eighteenth Day of October, 2011

David J. Kappos
*Director of the United States Patent and Trademark Office*